July 1, 1958
F. M. CLARK
2,841,633
ELECTRICAL CABLE STRUCTURE
Original Filed June 1, 1951
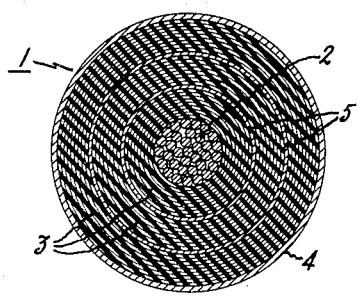
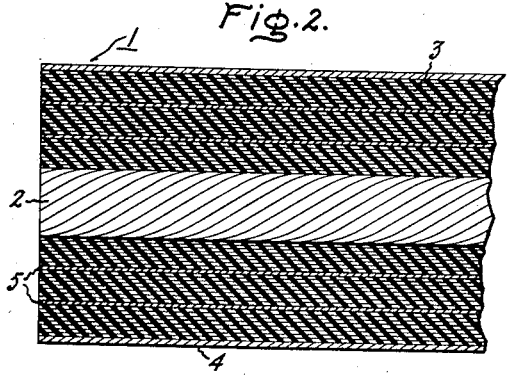
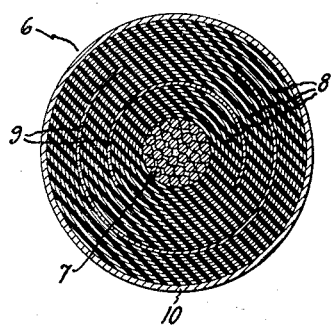
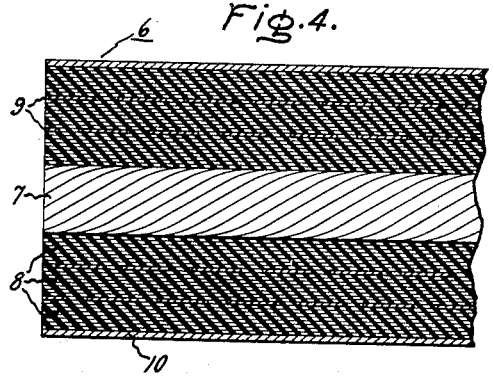
Inventor:
Frank M. Clark,
by ⟨signature⟩
His Attorney.

United States Patent Office 2,841,633
Patented July 1, 1958

2,841,633

ELECTRICAL CABLE STRUCTURE

Frank M. Clark, Schenectady, N. Y., assignor to General Electric Company, a corporation of New York Original application June 1, 1951, Serial No. 229,401, now Patent No. 2,782,248, dated February 19, 1957. Divided and this application December 3, 1956, Serial No. 625,796

9 Claims. (Cl. 174—25)

My invention relates to electrical cables. More particularly, it relates to electrical cables having an insulation of porous dielectric material impregnated with a dielectric liquid and in which the ionization or corona starting and breakdown voltages are increased by the introduction into the insulation of electron-impervious barriers. This application is a division of my copending application Serial No. 229,401, filed June 1, 1951, now Patent #2,782,248, and assigned to the same assignee as this application.

In cables insulated with liquid-impregnated porous material, of which paper is an example, the dielectric consists, in a practical sense, of a number of liquid films in series with the porous dielectric material. Since the voltage stress divides over the composite dielectric in inverse proportion to the dielectric constants of the component parts, a major part of the stress is imposed on the liquid except when the dielectric constant of the liquid is about equal to or greater than that of the solid dielectric. Improved dielectric strength is attained in the latter case by a more even distribution of the electrical stress. However, it is recognized that even under optimum conditions, dielectric failure under voltage is initiated in the liquid film because of its relatively low dielectric strength which, in general, is about one-third that of paper.

The normal liquid-impregnated insulation of a cable is also characterized by a relatively low impulse breakdown value, and this value cannot be substantially increased by a rise in the applied liquid or gas pressure. Since the sixty cycle breakdown is actually improved by such pressure increase, the impulse breakdown characteristic becomes the limiting factor in cable insulation design. To obtain improved impulse voltage strength recourse has been made to the use of very thin paper sheets as insulation. This is objectionable in cables because of the difficulty of assembly and increased cost.

It is known also that, progressing radially outwardly from a cable conductor through its insulation, the insulation breakdown voltage increases more slowly than does the thickness of the insulation. This means that the thinner dielectrics can be operated at higher voltage stresses than thicker layers. However, the thinner layers can often not be used because the total voltage which is to be actually applied is too great. For example, a two mil thick dielectric might fail at 1,500 volts per mil, whereas a ten mil thick dielectric might fail at only 1,000 volts per mil. However, the total breakdown voltage of the ten mil dielectric is 10,000 whereas it is only 3,000 volts for the two mil dielectric. If the rated voltage is 5,000 volts, obviously, the two mil material cannot be used, but the ten mil material can.

An object of my invention is to obtain an increase of the dielectric strength of liquid-impregnated cable insulation whereby higher voltages may be impressed thereon without reduction of the voltage safety factor.

Another object of my invention is to obtain in cable insulation of the liquid-impregnated type an increase in dielectric strength whereby thinner insulation may be used for given voltages without reduction of the voltage safety factor.

A further object of my invention is to provide a liquid-impregnated cable design whereby an increased voltage safety factor is realized for insulation thicknesses used heretofore.

Another object of my invention is to increase the ionization and corona formation voltage of electrical cable insulation with liquid-impregnated dielectric.

A still further object of my invention is to increase the ionization and breakdown voltage of liquid-impregnated cable insulation.

Other objects will become apparent from a consideration of the following description.

In brief, my invention relates to an electrical cable structure insulated with a liquid-impregnated dielectric, the dielectric being segmented in the radial direction by means of material which is a barrier to electrons or ions or which is impervious to electrons or ions under the operating conditions of such a cable.

My invention will be better understood from a consideration of the following description and the drawing in which Fig. 1 shows a radial cross-sectional view of typical cable structure according to my invention; Fig. 2 is a longitudinal cross-sectional view of the same cable, and Figs. 3 and 4 are cross-sectional views of another embodiment of my invention.

The breakdown of liquid-impregnated cable insulation under practical operating conditions is caused by ionization within the dielectric. This ionization disintegrates the insulation either by the mechanical and chemical effect of the ionic bombardment or as a result of the heat generated or by both factors. The presence in a defective cable of carbon paths, known to cable designers and operators as "treeing" is the visible evidence of destructive ionization and corona within the dielectric.

The ionization and corona formation voltages are, according to my invention, increased by separating the liquid-impregnated dielectric cable insulation into a series of segments or pads separated by electron-impervious barriers. The barriers are conveniently in strip form and are wound between layers of the regular insulation at preselected radial distances in any preferred fashion so long as at least one barrier is presented to prevent or block outward flow of electrons from the conductor. However, barriers in the form of sheets are also useful. The barrier in strip form is wound into the cable structure in any of a number of ways. For example, the strip is conveniently wound in helical overlapping fashion or with the butt edges of the strips in contact. This type of winding is shown in Figs. 1 and 2 wherein the conductor 2 of cable 1, made up of one or more conductor strands, is insulated with layers 3 of a dielectric such as paper impregnated with a liquid dielectric and has a protective outer sheath 4 of lead or other suitable material. The paper insulation is broken up by electron impervious barriers 5 which completely surround conductor 2.

Alternatively, where more than one barrier layer is employed, the strip may be wound in spaced helical manner, precautions being taken to insure that the succeeding layer is superimposed over any gaps in the under layer to obviate a direct path outwardly from the conductor. The structure resulting from this type of winding is easier to impregnate with the liquid dielectric. As shown in Figs. 3 and 4, cable 6, having conductor 7, is insulated as before with a porous sheet dielectric 8 such as paper impregnated with a suitable liquid. In this case, however, the electronimpervious barriers 9, having been helically wound in longitudinally spaced fashion, permit more readily the complete impregnation of the porous dielectric 8 with the liquid dielectric. It is to be particularly noted that barriers 9 are so arranged that the outer barrier is superimposed in radially spaced manner over the gaps in the inner barrier. The lead outer sheath is denoted by 10. While in the drawing there are shown structures having two barrier layers, it will be understood that any number of barriers can be used so long as the above basic teachings are observed.

While any of a number of porous dielectric materials may be used, I prefer to use kraft or Manila paper of the usual porous dielectric grades which is wound into the cable structure in a manner well known in the art.

Among the materials which can be used as barriers is metal foil such as that of aluminum, zinc, lead, copper, and other metals which may be prepared in thin sheets or strips. Foil having a thickness of from 0.2 ml to 0.5 mil is preferred. The metal foils can be described as floating in the porous dielectric with no electrical connections of any kind. Care should be exercised to use a metal foil or other barrier material which is not affected by the liquid dielectric.

To illustrate the advantages of metal foils in a cable structure, the following test was carried out using three mil kraft cable paper impregnated with mineral cable oil and aluminum foil barriers 0.5 mil thick. The dielectric with butt wound barrier inserts was treated with a vacuum dry at 100° C., and vacuum oil impregnation at 100° C. followed by a thorough oil soaking at 25° C. to allow complete absorption and the removal of any gas pockets. The various assemblies were tested to determine the voltage at which initial corona appeared and were also tested to the point of destruction corona. The results using different numbers of barriers are listed below, the total dielectric structure thickness being 18 mils in each case and the voltage being tested across one segment or pad of paper insulation as separated by the foil.

|  | Initial Corona (kv.) | | | | Destructive Corona (kv.) | | | |
|---|---|---|---|---|---|---|---|---|
| Thickness of Pad Tested (Mils) | 18 | 9 | 6 | 3 | 18 | 9 | 6 | 3 |
| No Barriers | 11 | | | | 11 | | | |
| One Barrier | | 18 | | | | 20.4 | | |
| Two Barriers | | | 19 | | | | 19 | |
| Five Barriers | | | | 16.5 | | | | 20.8 |

From these data it will be observed that according to the teaching of my invention, the initial corona voltage is increased from 11 kv. with no barriers to 19 kv. using two such barriers, an increase of over seventy-two percent, the dielectric being separated into three pads or segments each six mils thick. The destructive corona voltage is increased from 11 kv., when the oil impregnated dielectric is all in one pad, to 20.8 kv. when five floating barriers are used to divide the dielectric into six pads each three mils thick. The optimum over-all advantage is obtained when two floating barriers are used to obtain a seventy-two percent increase in both corona formation and destructive corona voltages.

The use of metal foils also has a salutary effect on the dielectric breakdown voltage stress. In the above test for determining the destructive corona voltage, the volts per mil at breakdown was 610 for no barriers, 1130 for one barrier, 1060 for two barriers, and 1150 for five barriers.

Similar results are obtained when other oils are used as the dielectric impregnant. For example, when a cottonseed oil impregnant was used with a total thickness of eighteen mils of three mil kraft paper sheets and no barriers, the corona formation voltage was 11.2 kv. With one barrier this voltage rose to 15.6 kv., and with five barriers to 16.4 kv. for a maximum increase of about 46 percent. Halogenated hydrocarbons are also useful in the present respect.

Resinous material such as those of cellulose esters, ethyl cellulose, methyl cellulose, benzyl cellulose, fluorinated polyethylenes, polyamides, and regenerated cellulose among others may also be used as barriers. Typical of the efficacy of such materials is that of cellulose acetate sheets. Illustrative of results obtained with cellulose acetate barrier material are the following experiments carried out using three mil kraft cable paper impregnated with mineral cable oil and various barriers, the total dielectric thickness being about 18 mils.

In practical manufacture and use, the ionization voltage leading to destructive corona formation and breakdown of the cable is lowered by the formation of gas or air pockets in the oil treated dielectric assembly. These pockets are most generally formed as a result of thermal changes in the cable following alteration of the electric load. The resulting expansion and contraction of the impregnant results in the formation of gas pockets which are commonly referred to as "dry areas." In order to illustrate the advantage of my invention even in the presence of such gas pockets or "dry areas" I have prepared the following dielectrics in accordance with the usual vacuum drying and vacuum oil impregnation practice and then have permitted the formation of a gas pocket within the insulation as, for example, by draining the oil treated assembly in air. One such pad made entirely of impregnated paper had a corona starting voltage of 4.8 kv. Another was made as above, but with one 0.5 mil thick aluminum foil barrier at the center of the dielectric and had a corona starting voltage of 6.1 kv. A series of pads using cellulose acetate barriers three mils thick was also fabricated. In one such pad the kraft paper was placed between two sheets of cellulose acetate which in turn were adjacent the conductor surfaces. The corresponding corona starting voltage was 4.9 kv. In another, the pad consisted in series of kraft paper against the conductor surface, cellulose acetate, kraft paper, cellulose acetate, and finally kraft paper against the second conductor surface. The corona starting voltage for such insulation was 7.2 kv. Still another structure having in series kraft paper against one conductor surface, cellulose acetate, and kraft paper against the other conductor surface had a corona starting voltage of 5.2 kv. It will thus be seen that resinous sheets also serve as excellent barriers in raising the corona starting voltage of cable insulation. It will also be noted that the high corona starting voltage is obtained when the kraft paper is placed next to the electrode or conductor surface.

Also useful in the practice of my invention are barriers made of paper coated with the resinous materials mentioned above. Of particular usefulness is the cellulose acetate coated paper described in my Patent 2,526,330, assigned to the same assignee as this application. Tests were conducted by making 18 mil thick insulating pads as described above using six sheets of three mil kraft cable paper impregnated with mineral cable oil for one assembly and sheets of three mil kraft cable paper coated 0.25 mil on each side with cellulose acetate as described in my above Patent 2,526,330 and impregnated with the same type of oil. The sixty cycle corona starting voltage for the plain paper insulation was 3 kv., whereas for the cellulose acetate coated paper structure it was 5 kv., an increase of two-thirds. When two floating foils of 0.5 mil aluminum foil were inserted and evenly spaced within the resin-coated sheet structure, the corona starting voltage rose to 9 kv., an increase of 200 percent over the ordinary kraft paper assembly.

By this invention there is provided means for increasing the corona or ionization voltage of cable insulation which permits higher voltage to be impressed upon a given insulation without decrease in the safety factor or allows the use of thinner insulations with the same voltage as now used on prior art cables without sacrifice of safety factor.

While I have described certain embodiments and combinations useful in the practice of my invention, it will be understood that other oil resistant resin or metal barriers are of equal utility, and are included within the scope of my invention. What I wish to protect is the use of electron-impervious barriers in cable insulation and all variations of this concept which do not depart from the spirit and scope of this invention.

What I claim as new and desire to secure by Letters Patent of the United States is:

1. A liquid dielectric filled electrical cable comprising an electrical conductor and layered paper insulation therefor impregnated with said liquid dielectric, each layer of paper being coated with resinous material, one layer of said paper insulation being in direct contact with said conductor and being separated from the next adjacent layer of said paper insulation by a layer of metal foil completely surrounding said conductor.

2. A liquid dielectric filled electrical cable comprising an electrical conductor, cellulosic insulation therefor comprising layers of paper coated with resinous material and impregnated with said liquid dielectric, at least one layer of said paper being adjacent said conductor, said insulation having disposed therein at least one layer of metal foil completely surrounding said conductor.

3. A liquid dielectric filled electrical cable comprising an electrical conductor, cellulosic insulation therefor comprising layers of paper coated with resinous material and impregnated with said liquid dielectric, one layer of said paper being in direct contact with said conductor, said insulation having disposed therein helically wound and spaced strips of metal foil, successive layers of such material being radially disposed over the gaps in the preceding layer so as to completely surround said conductor.

4. A liquid dielectric filled electrical cable comprising an electrical conductor, cellulosic insulation therefor comprising layers of paper coated with resinous material and impregnated with said liquid dielectric, one layer of said paper being in contact with said conductor, said insulation having disposed therein strips of metal foil wound in helical overlapping fashion so as to completely surround said conductor.

5. A liquid dielectric filled electrical cable comprising an electrical conductor, cellulosic insulation therefor comprising layers of paper coated with resinous material and impregnated with said liquid dielectric, one layer of said paper being in direct contact with said conductor, said paper insulation having disposed therein at least one sheet of metal foil completely surrounding said conductor.

6. A liquid dielectric filled electrical cable comprising an electrical conductor, cellulosic insulation therefor comprising layers of paper impregnated with said liquid dielectric, at least one layer of said paper being adjacent said conductor, said insulation having therein resinous material and metal foil each completely surrounding said conductor.

7. A liquid dielectric filled electrical cable comprising an electrical conductor, cellulosic insulation therefor comprising layers of paper impregnated with said liquid dielectric, one layer of said paper being in direct contact with said conductor, said insulation having disposed therein helically wound and spaced strips of resinous material and metal foil, and layers of such resinous material and metal foil radially disposed over the gaps in the preceding layer so as to completely surround said conductor.

8. A liquid dielectric filled electrical cable comprising an electrical conductor, cellulosic insulation therefor comprising layers of paper impregnated with said liquid dielectric, one layer of said paper being in direct contact with said conductor, said insulation having disposed therein strips of resinous material and metal foil each wound in helically overlapping fashion so as to completely surround said conductor.

9. A liquid dielectric filled electrical cable comprising an electrical conductor, cellulosic insulation therefor comprising layers of paper impregnated with said liquid dielectric, one layer of said paper being in direct contact with said conductor, said paper insulation having disposed therein at least one layer of resinous material and at least one layer of metal foil completely surrounding said conductor.

References Cited in the file of this patent

UNITED STATES PATENTS

| | | |
|---|---|---|
| 1,886,786 | Branthwaite | Nov. 8, 1932 |
| 2,288,969 | Kirkwood | July 7, 1942 |
| 2,526,330 | Clark | Oct. 17, 1950 |